United States Patent [19]
Tholander et al.

[11] 3,977,965
[45] Aug. 31, 1976

[54] METHOD OF BIOLOGICAL PURIFICATION OF SEWAGE

[75] Inventors: Bent Kure Tholander, Lyngby; Svend Krarup, Bagsvaerd, both of Denmark

[73] Assignee: Akvadan A/S, Denmark

[22] Filed: Jan. 27, 1975

[21] Appl. No.: 544,482

Related U.S. Application Data

[63] Continuation of Ser. No. 376,236, July 3, 1973, abandoned.

[30] Foreign Application Priority Data

July 5, 1972 Denmark .......................... 3351/72

[52] U.S. Cl. .................................... 210/11; 210/4; 210/14; 210/16; 210/DIG. 28
[51] Int. Cl.² ............................................. C02C 1/10
[58] Field of Search ............... 210/2, 14, 15, 16, 18, 210/142, 195, 201, 219, 221, 3, 11, DIG. 28, 4–8

[56] References Cited
UNITED STATES PATENTS

| | | | |
|---|---|---|---|
| 1,286,017 | 11/1918 | Jones | 210/15 |
| 2,875,151 | 2/1959 | Davidson | 210/14 |
| 3,382,981 | 5/1968 | Hampton | 210/142 |
| 3,442,386 | 5/1969 | Malm et al. | 219/219 |
| 3,470,092 | 9/1969 | Bernard | 210/15 |
| 3,534,857 | 10/1970 | Berk | 210/14 |
| 3,579,439 | 5/1971 | Meiring et al. | 210/195 |
| 3,776,841 | 12/1973 | Torpey | 210/17 |
| 3,817,857 | 9/1972 | Torpey | 210/16 |

*Primary Examiner*—Charles N. Hart
*Assistant Examiner*—Peter A. Hruskoci
*Attorney, Agent, or Firm*—Watson, Cole, Grindle & Watson

[57] ABSTRACT

A method of biological purification of sewage in a purification plant in order to decompose organic material and in order to remove inorganic compounds, mainly nitrogen compounds, wherein the plant comprises three tanks only, of which at least two sequentially serve as a feeding tank for the sewage and at least one as a clarification tank, and wherein the sewage at any time is subjected to an aerobic treatment in the plant by means of aeration and simultaneous circulation of the sewage, and wherein a tank, which during a period serves as feeding tank, at least during a part of such period is driven in such a manner that sewage is only circulated, substantially, under anaerobic conditions, the tank being indirectly connected, during at least said part of said period, to a tank serving as clarification tank, viz. via the tank not serving as clarification tank, and by establishing aerobic conditions in a tank after each anaerobic treatment therein and before it is used as clarification tank or is connected to a tank, serving as clarification tank.

3 Claims, 18 Drawing Figures

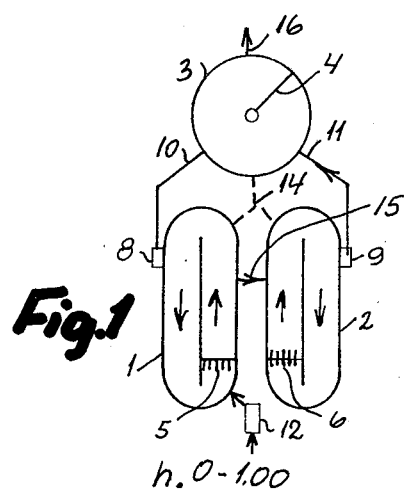
Fig.1  h. 0-1.00
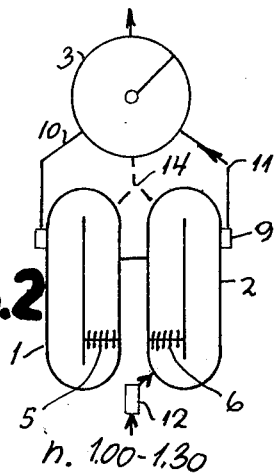
Fig.2  h. 1.00-1.30
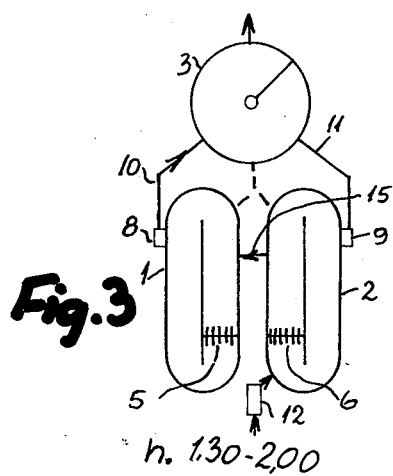
Fig.3  h. 1.30-2.00
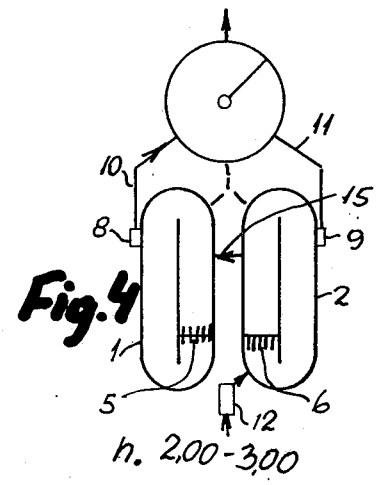
Fig.4  h. 2.00-3.00
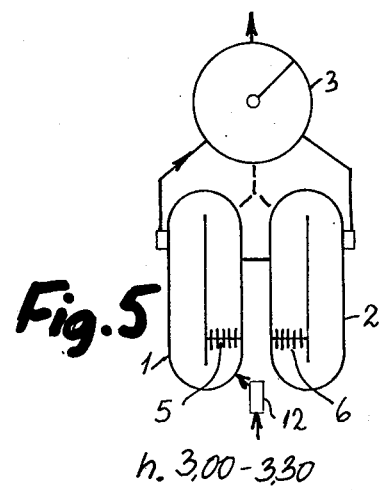
Fig.5  h. 3.00-3.30
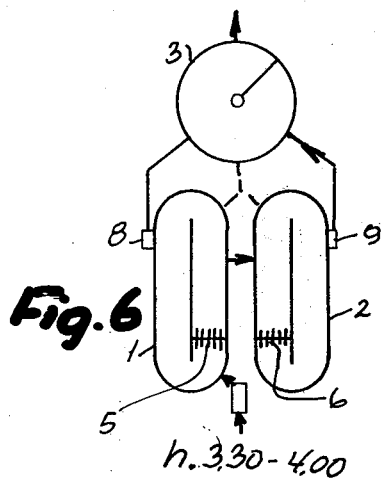
Fig.6  h. 3.30-4.00

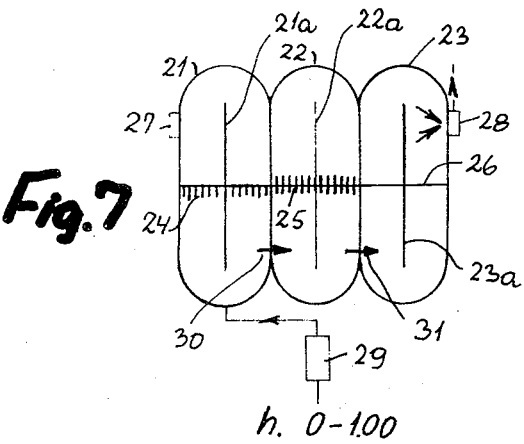
h. 0-1.00
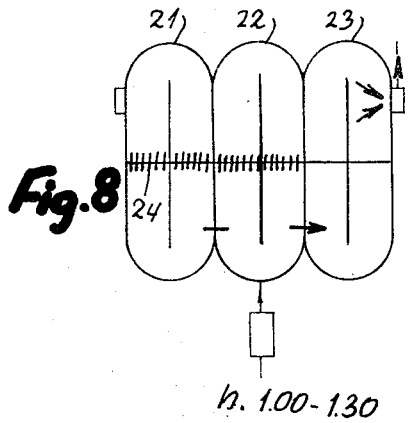
h. 1.00-1.30
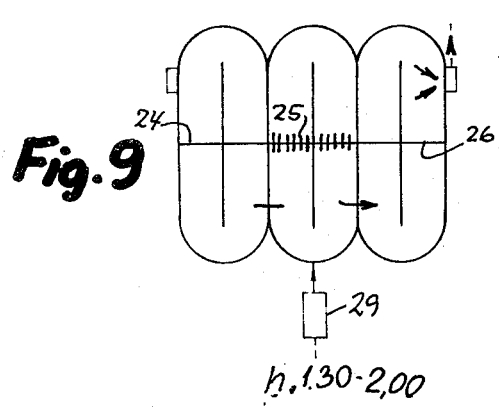
h. 1.30-2.00
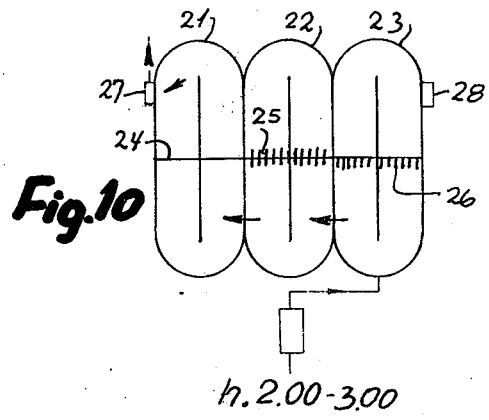
h. 2.00-3.00
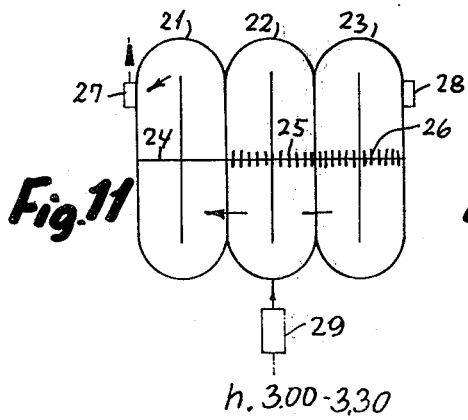
h. 3.00-3.30
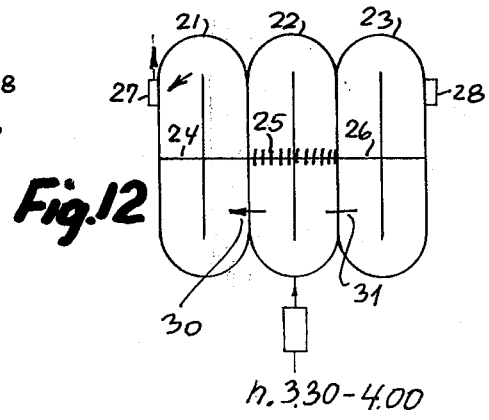
h. 3.30-4.00

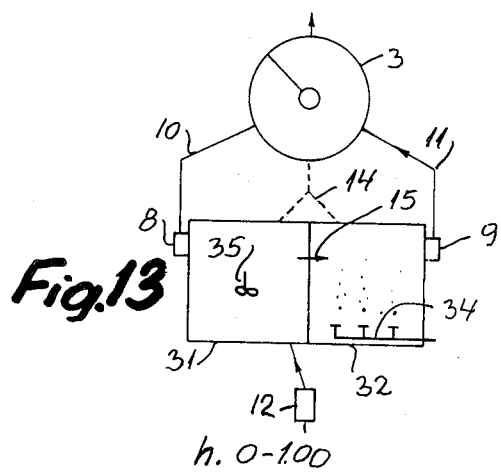
Fig.13   h. 0-1.00
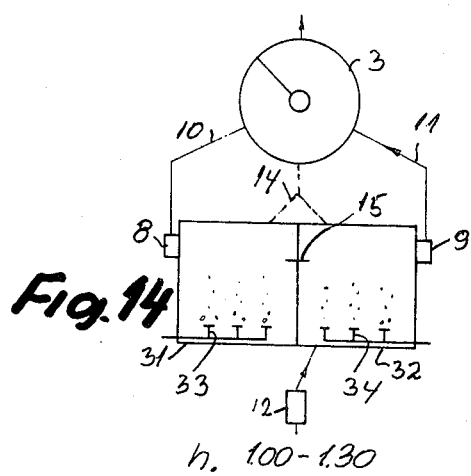
Fig.14   h. 1.00-1.30
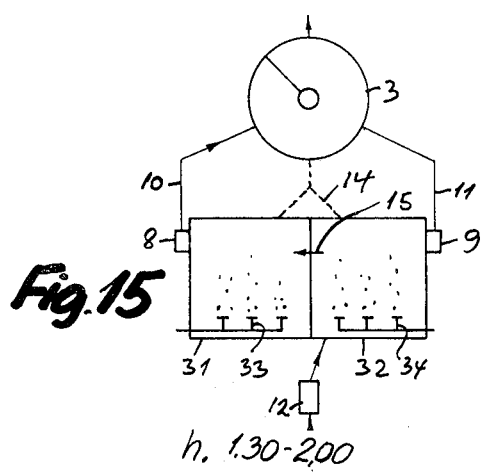
Fig.15   h. 1.30-2.00
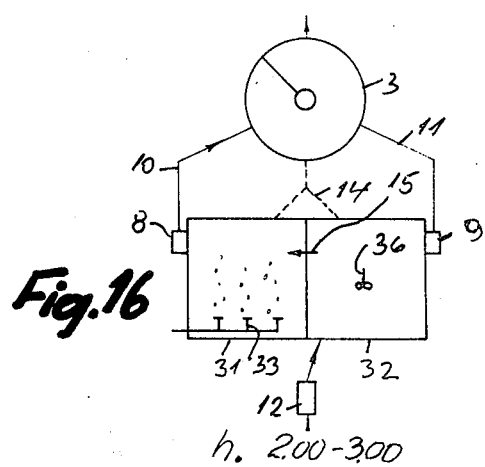
Fig.16   h. 2.00-3.00
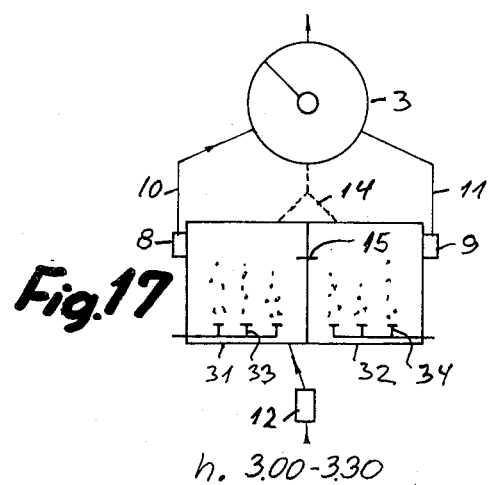
Fig.17   h. 3.00-3.30
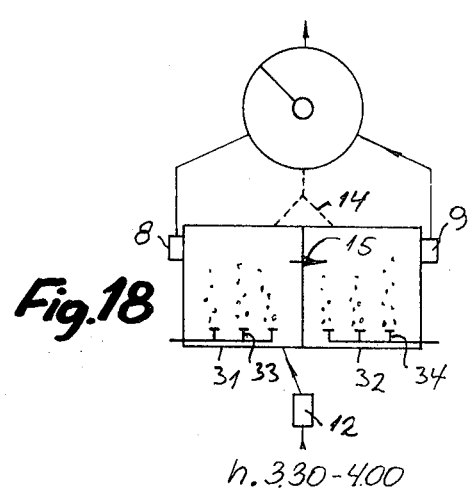
Fig.18   h. 3.30-4.00

METHOD OF BIOLOGICAL PURIFICATION OF SEWAGE

This is a continuation of application Ser. No. 376,236 filed July 3, 1973, now abandoned.

BACKGROUND OF THE INVENTION

The present invention relates to a method of biological purification of sewage in a purification plant comprising three tanks only, of which at least two sequentially serve as a feeding tank for the sewage and at least one as a clarification tank, and wherein the sewage at any time is subjected to an aerobic treatment in the plant by means of aeration and simultaneous circulation of the sewage.

Such method may be carried out in two different ways. In the first instance, one and the same tank is always used as clarification tank and the two other tanks are sequentially used as feeding tanks, and in the last mentioned tanks, the sewage is subjected to an aeorbic treatment by adding air to the sewage and circulating the sewage. A rather simple plant may be used for carrying out this method due to the fact that only two of the tanks have to be provided with the mechanical means necessary for adding the air and for circulating the sewage.

According to the other known method, a plant is used wherein all three tanks are provided with means for adding air to the sewage and for circulating the sewage, and the three tanks are used in accordance to a predetermined scheme sequentially as clarification tank, as feeding tank for the sewage, and as aerobically working tanks.

By means of the last mentioned method, organic materials are removed from the sewage because the organic materials are decomposed and deposited as sludge in the clarification tank from which the sludge may be returned to the aeration tanks and surplus sludge, if any, may be removed.

After such treatment the sewage still contains inorganic compounds.

It is the object of the present invention to provide a method of the former kind by means of which the sewage may be purified for inorganic compounds also, in particular nitrogen compounds.

In order to purify sewage for both organic materials and nitrogen compounds, it is known to treat the sewage in the following way:

During a first step, the sewage is subjected to an aerobic treatment in an aeration tank and is then passed to an after-clarification tank. The sluge from the after-clarification tank is returned to the aeration tank, and the water from the after-clarification tank is passed to another aerobically working aeration tank wherein the nitrogen compounds are oxidized into nitrate (nitrification) by the action from microorganisms. After such aeration, the water is fed to an after-clarification tank and therefrom to a third tank wherein the water is subjected to an anaerobic treatment during which a nourishing agent for micro-organisms is added so that such microorgansims are able to reduce the nitrate into free nitrogen (denitrification) which escapes from the water. From the last mentioned tank the sewage is transferred to an after-clarification tank from which the purified sewage is removed. The sludge from the latter after-clarification tank is returned to the denitrification tank.

This dividing into three steps is made in order to secure that the correct microorganisms work in each of the steps viz. in the first step for decomposing organic material, in the second step for nitrification and in the third step for denitrification. Accordingly, this known method requires three tanks each followed by an after-clarification tank, and the sewage must pass these six tanks in series.

An attempt has been made for simplifying such plants by making a pilot-plant (Wuhrmann) wherein the sewage is fed to a first tank wherein the sewage is treated aerobically in order to achieve nitrification. Then the sewage is passed to another tank wherein it is treated anaerobically in order to reduce the nitrate produced in the first tank into free nitrogen. The sludge contained in the second tank is mineralized in order to produce the energy necessary for the denitrification. However, only under specific circumstances, this simplified method has worked successfully presumably because the sole source of energy for the denitrification is the mineralization of the sludge. However, the plant is simple due to the fact that only three tanks are necessary, arranged after each other, of which the last tank works as an after-clarification tank from which the sludge deposited is returned to the first tank.

SUMMARY OF THE INVENTION.

The method according to the present invention is characterized in that a tank, which during a period serves as feeding tank, at least during a part of such a period is driven in such a manner that the sewage is only circulated, substantially, under anaerobic conditions, the tank being indirectly connected, during at least said part of said period, to the tank serving as clarification tank, viz. via the tank not serving as clarification tank and by establishing aerobic conditions in a tank after each anaerobic treatment therein and before it is used as clarification tank or is connected to a tank, serving as clarification tank. By means of this method it is possible to use the plant for biological purification of sewage for organic materials, previously referred to, also for removing a sufficiently great part of the nitrogen compounds in the sewage. The invention is based upon the realization that a mixing of the different colonies of the microorganisms which are responsible for the decomposition of the organic materials, the nitrification and the denitrification, respectively, is quite insignificant, and, moreover, it has been realized that the anaerobic treatment of the sewage during the addition of untreated sewage creates suitable conditions for the growth of the microorganisms which are responsible for the denitrification. In this connection it should be noticed that due to the fact that at least two tanks are used alternatively as feeding tanks and between these periods are being used for aerobic treatment, a considerable amount of sewage, which during a preceding step of a method has been subjected to an aerobic treatment and, accordingly, also to a nitrification, will be present in a tank when it is used as feeding tank and, accordingly, the nitrates produced may be reduced by the microorganisms working to this effect. Moreover, the growth of such microorganisms will be supported by the fresh organic materials added to the tank in question due to the feeding of the sewage to the tank. Moreover, the good biological purification achieved by the known plants will be maintained. Moreover, it is characteristic for the known plants, comprising three tanks only referred to above, that each tank discharges liquid corresponding to the amounts of liquid supplied so that all the tanks always work with the same degree of filling. Also this advantageous condition is maintained by using the method according to the invention. Furthermore, due to the fact that a tank is always driven aerobically after an anaerobic period and before it is used as clarification tank or is connected to a tank, serving as clarification tank, a decomposition of organic materials is always secured.

In case a method according to the present invention is used, during which a feeding tank works anaerobically only during a part of the period wherein it serves as feeding tank, it is preferred according to the present invention to drive said tank anaerobically during the last part of said period and aerobically during the first part of said period and to drive the tank, not serving as clarification tank during said first part of said period, aerobically. This particular embodiment of the method according to the invention offers the advantage that the maximum amount of nitrified nitrogen compounds will be available for the denitrification. Moreover, due to the fact that the tank which does not serve as clarification tank during said first part of the period, is driven aerobically, a suitable long aerobic treatment of the sewage as a whole is achieved.

According to a still further embodiment, the method is characterized by connecting the feeding tank directly with the tank serving as clarification tank, during the first part of the aerobic period of said feeding tank and by connecting said feeding tank indirectly with the clarification tank, viz. via the third tank during the last part of the aerobic period and during the anaerobic period in the feeding tank.

BRIEF DESCRIPTION OF THE DRAWINGS.

FIGS. 1–6 show a first embodiment of the plant for purification of sewage according to the present invention shown in six different states of operation for illustrating the method according to the present invention, FIGS. 7–12 show another embodiment of the sewage purification plant according to the present invention, also in six different states of operation, and FIGS. 13–18 show a third embodiment of the plant according to the invention, also in six different states of the operation.

DESCRIPTION OF THE PREFERRED EMBODIMENTS.

The sewage purification plant illustrated in FIGS. 1–6 comprises two basins 1 and 2 each of which is formed as an oval upwardly open channel. Moreover, the plant comprises an after-clarification tank 3, comprising a scraper 4 for sludge.

Each of the basins is provided with a rotor 5 and 6, respectively, which by rotation circulates the water in the two basins in the direction indicated by arrows. Each of the basins has a weir 8 and 9, respectively, which may be raised and lowered. Each weir is by means of a conduit 10 and 11, respectively, connected with a clarification tank 3. Sewage may be fed to the two basins from a feeding station 12.

Driving means (not shown) for the rotors 5 and 6 are adjustable in such a way that the rotors either circulate the liquid in the corresponding basin or both circulate the liquid and aerate the liquid, viz. whips air into the liquid. In the first instance, the basin in question works anaerobically and in the latter instance aerobically. In order to indicate on the drawing whether one or the other operation is carried out in the different stages shown, a rotor which only circulates the liquid is shown as half a rotor (paddles projecting from one side only of a shaft) whereas a rotor which both circulates the liquid and aerates it is shown in full (paddles projecting from both sides of a shaft), cf. the rotors 5 and 6, respectively, in FIG. 1.

Moreover, the plant comprises a ducting system, connecting the after-clarification tank 3 and each of the basins 1 and 2 for returning sludge from the clarification tank to the basins. Surplus sludge, if any, may be removed from the clarification tank by means not shown on the drawing. The two basins 1 and 2 are mutually connected by means of a transfer duct 15 which, in order to illustrate the stages during which transfer of liquid from one basin to the other takes place, is provided with an arrow, pointing in the direction of flow. The clarification tank 3 is connected to a discharge 16 for clarified water.

In FIG. 1, a condition is shown, wherein sewage is fed to the basin 1, the rotor 5 of which works only for circulating the sewage in the basin, viz. anaerobically. The weir 8 of the basin 1 is in the lifted position and the weir 9 of the other basin 2 is in the lowered position and, accordingly, transfer takes place through the transfer duct 15 as indicated by the arrow. The rotor 6 in the basin 2 works at full revolutions, aerobically, and via the lowered weir 9 and via a conduit 11, a connection is provided to the after-clarification tank 3. This condition lasts for an hour as indicated by the time stated below, FIG. 1, and is the last state before the feeding of the sewage is shifted over to the basin 2.

Accordingly, in the stage illustrated in FIG. 1, the sewage is treated anaerobically and during this state, a denitrification is made as previously explained.

After the lapse of one hour the plant is shifted over to the condition shown in FIG. 2 by shifting over the supply of sewage from the basin 1 to the basin 2 and by increasing the velocity of the rotor 5 in order to obtain aerobic condition in the basin 1. No further shifting is made and, accordingly, both basins 1 and 2 now work aerobically for decomposing organic materials and in order to achieve nitrification. This stage is maintained for half an hour, and then the plant is shifted over to the stage shown in FIG. 3 by closing the weir 9 and opening the weir 8 for feeding the after-clarification tank 3 via the duct 10, and simultaneously, to pass liquid from the basin 2 to the basin 1 via the transfer duct 15. During this stage aerobic conditions are maintained in both basins for decomposing organic material and for nitrification.

After the lapse of half an hour the plant is shifted over to the condition shown in FIG. 4 by decreasing the velocity of the rotor 6 of the basin 2. Accordingly, the basin 2 now works anaerobically for denitrification of the sewage previously nitrified. During this stage, which lasts for one hour, sewage is fed to the basin 2 and, accordingly, the fresh added sewage can nourish the anaerobically working micro-organisms in the sewage in the basin 2. After the stage shown in FIG. 4, the plant is shifted over to the stage shown in FIG. 5 by shifting over the feeding of the sewage to the basin 1 and by increasing the velocity of the rotor 6 to full speed for working aerobically in the basin 2. The flow of liquid to the after-clarification tank 3 is not changed and, accordingly, the water in the basin 2, which during the preceding period was treated anaerobically, will now be treated aerobically during half an hour as indicated below in FIG. 5. During this state denitrified compounds will escape from the basin 2, viz. in the form of free nitrogen.

After the lapse of half an hour the plant is shifted over to the condition shown in FIG. 6 by lowering the weir 9 and raising the weir 8 so that the water which has been aerated in the basin 2 can start to flow to the after-clarification tank 3, and aerobic decomposition of organic material can continue in the basin 1. After the stage illustrated in FIG. 6 has lasted for half an hour, the plant is shifted over to the condition shown in FIG. 1 by decreasing the velocity of the rotor 5 so as to obtain anaerobic treatment and denitrification in the basin 1 as shown in FIG. 1.

From the above explanations it will be understood that one of the basins works as receiver basin for 2 hours, and then the other basin works as receiver for 2 hours and during the last hour of each such receiving period, the receiving basin works anaerobically and during the remaining three hours of the total working cycle which amounts to four hours, the receiving basin works aerobically. Moreover, the sewage is treated aerobically before transfer of water to the after-clarification tank 3 takes place. Each basin accomodates an amount of sewage corresponding to the amount of sewage which is fed to the plant during 12 hours.

The plant shown in FIGS. 7–12 comprises three oval basins 21, 22 and 23 built together and each having a central guiding wall 21a, 22a, 23a as the basins 1 and 2 in FIGS. 1–6.

All the basins according to the embodiment in FIGS. 7–12 are provided with rotors 24, 25 and 26, and each of the two outer basins 21 and 23 is provided with an adjustable weir 27 and 28, respectively, connected to a discharge. Moreover, each of the two outer basins 21 and 23 is connected with the central basin 22 via transfer ducts 30 and 31. The sewage is fed from a sewage source 29 which is shiftable so as to shift over the feeding of the sewage between all three basins.

In FIGS. 7–12 the same symbols as in FIGS. 1–6 are used as regards the operations of the rotors, however, with the difference that a not working rotor is indicated by a simple line, cf. the rotor 26 of FIG. 7, wherein the basin 23 works as clarification tank.

The plant shown in FIGS. 7–12 operates in the following way:

During the stage shown in FIG. 7 which lasts for 1 hour, the basin 21 serves as receiver and its rotor 24 rotates with reduced velocity and, accordingly, the sewage in the basin 21 is treated anaerobically. Moreover, the weir 27 of the basin 21 is in the raised position whereas the weir 28 of the basin 23 is lowered and, accordingly, water is discharged from the latter basin which serves as clarification basin. As stated above, this condition is indicated by illustrating the rotor 26 as a simple line. Accordingly, the liquid flows through the basins in series, viz. from the basin 21 to the basin 22 and to the basin 23 via the transfer ducts 30 and 31 as indicated by arrows. Denitrification is carried out in the basin 21 and in the basin 22, organic materials are decomposed and nitrified.

After a period of one hour the plant is shifted over to the stage shown in FIG. 8 by shifting over the source 29 from the basin 21 to the basin 22 and by increasing the velocity of the rotor 24 to full speed. Accordingly, the anaerobic condition in the basin 21 is stopped, and an aerobic condition is established in order to aerate the sewage before clarification. Decomposition of organic materials and nitrification is carried out in the centre basin 22. The outer basin 23 still serves as clarification tank, and only water which has been subjected to a dentrification followed by an aeration is transferred thereto. After a working period of half an hour the plant is shifted over to the stage shown in FIG. 9. The feeding of the sewage is maintained unchanged but the rotor 24 of the basin 21 is stopped in order to initiate clarification without circulation in the basin 21. After half an hour the plant is shifted over to the stage shown in FIG. 10 by changing over the feeding of sewage from the basin 22 to the basin 23 and by closing the weir 28 of the basin 23. Moreover, the weir 27 of the basin 21 is opened, and the rotor 26 is started for half power in order to create anaerobic treatment in the basin 23 for denitrification. This stage lasts for one hour, and then the plant is shifted over to the stage shown in FIG. 11 by increasing the velocity of the rotor 26 to full speed for aeration. After half an hour the plant is shifted over to the stage shown in FIG. 12 by stopping the rotor 26 in order to initiate clarification in the basin 23 during the half hour period of this stage. After this stage the basin 23 is prepared to discharge clarified water when shifting over to the stage shown in FIG. 7 takes place.

Accordingly, in the plant shown in FIGS. 7–12, a basin starts to work anaerobically when it starts to receive sewage.

In the two embodiments explained above, rotors having projecting wings or paddles are used both to circulate the water and to whip air into the water. Full velocity results in both effects whereas a reduced velocity results only in circulation.

However, the present invention is not limited to such versatility although a very simple plant is achieved. The invention may also be carried out as shown in FIGS. 13–18. The plant shown therein comprises separate members for circulating in the form of stirring members and members which create both introducing of air and circulation, viz. by blowing air into the tanks of the plant.

The plant shown in FIGS. 13–18 contains two tanks 31 and 32 each provided with means 33 and 34 for introducing air and a stirring member 35 and 36, respectively. Otherwise, the plant is constructed and connected as the plant shown in FIGS. 1–6, viz. comprises an after-clarification tank 3 connected with both the tanks 31 and 32 via ducts 10 and 11, respectively. Moreover, each of the tanks has a weir 8 and 9, respectively, and they are mutually connected by means of a transfer duct 15. Moreover, the after-clarification tank 13 is connected with both tanks by means of a sludge return system 14.

In FIGS. 13–18 symbols are used corresponding to the other plants. Arrows indicate when fluid flows through the transfer duct 15 and arrows indicate feeding of the after-clarification tank 13 through the two ducts 10 and 11. Finally, circulation or anaerobic treatment is symbolized by the stirring member of the tank concerned whereas aerobic treatment is symbolized by gear introducing members 33 and 34, respectively, which also produce circulation.

Due to the fact that the working cycle for the plant shown in FIGS. 13–18 is exactly the same as explained in connection with the plant according to FIGS. 1–6, a detailed explanation of the plant shown in FIGS. 13–18 is superfluous and will be immediately understood from the symbols shown.

From the above explanations it will be understood that any basin or tank which is fed with liquid also discharges liquid during the feeding period and, accordingly, all basins and tanks work with an almost constant degree of filling.

We claim:

1. A method for biologically purifying sewage utilizing a first, a second and a third treatment tank, said method comprising:

coupling said tanks in a first series flow-arrangement, in which said first tank serves as the initial tank, said second tank as the middle tank and said third tank as the final tank and, during a first phase of the process, feeding raw sewage to said first tank and transferring sewage from said first tank to said second tank and from said second tank to said third tank; during a portion of said first phase, treating the sewage in said first tank for nitrification by circulating the sewage under aerobic conditions so as to produce nitrates from the sewage and, during another portion of said first phase, treating the sewage in said first tank for denitrification by circulating the sewage under anaerobic conditions while utilizing raw sewage received by said first tank as an energy source for said denitrification, during said first phase, moreover, treating the sewage in said second tank for nitrification by circulating the sewage under aerobic conditions so as to produce nitrates from the sewage and treating the sewage in said third tank for clarification and removing clarified water from said third tank;

terminating said first phase by uncoupling said first tank from said first series flow-arrangement and, thereafter, during a second phase of the process, feeding raw sewage to said second tank and transferring sewage from said second tank to said third tank, treating the sewage in said second tank for nitrification by circulating the sewage under aerobic conditions so as to produce nitrates from the sewage, treating the sewage in said third tank for clarification and removing clarified water from said third tank, while continuing to treat the sewage in said uncoupled first tank for nitrification by circulating the sewage under aerobic conditions;

terminating said second phase by re-arranging said tanks in a second series flow-arrangement, in which said second tank serves as the initial tank, said first tank as middle tank and said third tank as the final tank and during a third phase of the process, feeding raw sewage to said second tank and transferring sewage from said second tank to said first tank and from said first tank to said third tank; during a portion of said third phase, treating the sewage in said second tank for nitrification by circulating the sewage under aerobic conditions so as to produce nitrates from the sewage and, during another portion of said third phase, treating the sewage in said second tank for denitrification by circulating the sewage under anaerobic conditions while utilizing raw sewage received by said second tank as an energy source for said denitrification, during said third phase, moreover, treating the sewage in said first tank for nitrification by circulating the sewage under aerobic conditions so as to produce nitrate from the sewage and treating the sewage in said third tank for clarification and removing clarified water from said third tank;

terminating said third phase by uncoupling said second tank from said second series flow-arrangement and thereafter, during a fourth phase of the process, feeding raw sewage to said first tank and transferring sewage from said first tank to said third tank, treating the sewage in said first tank for nitrification by circulating the sewage under aerobic conditions so as to produce nitrates from the sewage, treating the sewage in said third tank for clarification and removing clarified water from said third tank, while continuing to treat the sewage in said uncoupled second tank for nitrification by circulating the sewage under aerobic conditions;

terminating said fourth phase by rearranging said tanks in said first series flow-arrangement and repeating the method.

2. A method as set forth in claim 1, wherein the sewage in said first tank is treated for nitrification by circulating the sewage under aerobic conditions during a first portion of said first phase and for denitrification by circulating the sewage under anaerobic conditions during the remaining portion of said first phase, and wherein the sewage in said second tank is treated for nitrification by circulating the sewage under aerobic conditions during a first portion of said third phase and for denitrification by circulating the sewage under anaerobic conditions during the remaining portion of said third phase.

3. A method for biologically purifying sewage utilizing a first, a second and a third treatment tank, said method comprising:

coupling said tanks in a first series flow-arrangement in which said first tank serves as the initial tank, said second tank as the middle tank and said third tank as the final tank and, during a first phase of the process, feeding raw sewage to said first tank and transferring sewage from said first tank to said second tank and from said second tank to said third tank; during said first phase treating the sewage in said first tank for denitrification of nitrates present therein by circulating the sewage under anaerobic conditions while utilizing raw sewage received by said first tank as an energy source for said denitrification, during said first phase, moreover, treating the sewage in said second tank for nitrification by circulating the sewage under aerobic conditions so as to produce nitrates from the sewage and treating the sewage in said third tank for clarification and removing clarified water from said third tank;

terminating said first phase by uncoupling said first tank from said first series flow-arrangement and, thereafter, during a second phase of the process, feeding raw sewage to said second tank and transferring sewage from said second tank to said third tank, treating the sewage in said second tank for nitrification by circulating the sewage under aerobic conditions so as to produce nitrates from the sewage, treating the sewage in said third tank for clarification and removing clarified water from said third tank and, during a first portion of said second phase, treating the sewage in said uncoupled first tank for nitrification by circulating the sewage under aerobic conditions and, during the remaining portion of said second phase treating the sewage in said uncoupled first tank for clarification;

terminating said second phase by rearranging said tanks in a second series flow-arrangement in which said third tank serves as the initial tank, said second tank as the middle tank and said first tank as the final tank, and during a third phase of the process, feeding raw sewage to said third tank and transferring sewage from said third tank to said second tank and from said second tank to said first tank; during said third phase, treating the sewage in said third tank for denitrification of nitrates present therein by circulating the sewage under anaerobic conditions while utilizing raw sewage received by said third tank as an energy source for said denitrification, during said third phase moreover treating the sewage in said second tank for nitrification by circulating the sewage under aerobic conditions so as to produce nitrates from the sewage and treating the sewage in said first tank for clarification and removing clarified water from said first tank;

terminating said third phase by uncoupling said third tank from said second series flow-arrangement and thereafter, during a fourth phase of the process, feeding raw sewage to said second tank and transferring sewage from said second tank to said first tank, treating the sewage in said second tank for nitrification by circulating the sewage under aerobic conditions so as to produce nitrates from the sewage, treating the sewage in said first tank for clarification and removing clarified water from said first tank and, during a first portion of said fourth phase, treating the sewage in said uncoupled third tank for nitrification by circulating the sewage under aerobic conditions and, during the remaining portion of said second phase treating the sewage in said uncoupled third tank for clarification, rearranging said tanks at the end of said fourth phase in said first series flow-arrangement and repeating the method.

* * * * *